(12) United States Patent
Shivaprasad et al.

(10) Patent No.: US 12,534,092 B2
(45) Date of Patent: Jan. 27, 2026

(54) AUTOMATED ADJUSTMENT OF VEHICLE DIRECTION BASED ON ENVIRONMENT ANALYSIS

(71) Applicant: Tesla, Inc., Austin, TX (US)

(72) Inventors: Shreyas Shivaprasad, Mountain View, CA (US); Riccardo Lopez, Mountain View, CA (US); Jason McLoud, San Jose, CA (US); Ibrahim Shaikh, Redwood City, CA (US); Michael Rizkalla, Los Altos, CA (US); Silvio Brugada, San Francisco, CA (US); Aleksei Potov, San Jose, CA (US); Richard Baverstock, San Jose, CA (US); David Exe, Mountain View, CA (US); Romanie Cnockaert, Wervik (BE); Alec de Zegher, Millbrae, CA (US)

(73) Assignee: Tesla, Inc., Austin, TX (US)

( * ) Notice: Subject to any disclaimer, the term of this patent is extended or adjusted under 35 U.S.C. 154(b) by 42 days.

(21) Appl. No.: 18/449,606

(22) Filed: Aug. 14, 2023

(65) Prior Publication Data
US 2024/0051558 A1    Feb. 15, 2024

Related U.S. Application Data

(60) Provisional application No. 63/371,370, filed on Aug. 12, 2022.

(51) Int. Cl.
*B60W 50/08*    (2020.01)
*B60W 60/00*    (2020.01)

(52) U.S. Cl.
CPC .......... *B60W 50/082* (2013.01); *B60W 60/00* (2020.02); *B60W 2540/12* (2013.01); *B60W 2540/215* (2020.02); *B60W 2540/30* (2013.01)

(58) Field of Classification Search
CPC .............. B60W 50/082; B60W 60/00; B60W 2540/215; B60W 2540/12; B60W 2540/30
See application file for complete search history.

(56) References Cited

U.S. PATENT DOCUMENTS

| 11,011,301 B2 | 5/2021 | Sato et al. |
| 11,932,230 B1 | 3/2024 | Langlotz |

(Continued)

FOREIGN PATENT DOCUMENTS

| EP | 0 835 796 | 4/1998 |
| GB | 2493446 | 2/2013 |
| WO | WO 2024/253719 | 12/2024 |

OTHER PUBLICATIONS

Hyatt, Jun. 11, 2021, Here's how Tesla's new Auto Shift works, CNET, 8 pp.

*Primary Examiner* — James J Lee
*Assistant Examiner* — Steven Vu Nguyen
(74) *Attorney, Agent, or Firm* — Knobbe, Martens, Olson & Bear, LLP

(57) ABSTRACT

The present disclosure relates to systems and methods for managing vehicle operations utilized for autonomous driving. An example method includes obtaining a set of inputs corresponding to a set of operational information associated with a vehicle; responsive to determined trigger, processing the set of inputs to determine whether the vehicle is available for travel; processing the set of inputs to determine whether at least one occupant has indicated an intent for the vehicle to initiate travel; responsive to determined vehicle availability for travel and determined intent for the vehicle to initiate travel, identifying a set of vehicle operational parameters corresponding to a determined path of travel; and causing the initiation of the identified set of vehicle operational parameters.

20 Claims, 10 Drawing Sheets

(56) References Cited

U.S. PATENT DOCUMENTS

| | | | |
|---|---|---|---|
| 12,221,104 B1 | 2/2025 | Langlotz | |
| 12,227,184 B1 | 2/2025 | Langlotz | |
| 12,233,871 B1 | 2/2025 | Langlotz | |
| 12,240,456 B1 | 3/2025 | Langlotz | |
| 12,240,457 B1 | 3/2025 | Langlotz | |
| 12,240,458 B1 | 3/2025 | Langlotz | |
| 2012/0203424 A1* | 8/2012 | Filev | B60W 50/00 701/36 |
| 2019/0147678 A1* | 5/2019 | Saiki | B60R 25/24 340/5.64 |
| 2019/0310633 A1* | 10/2019 | Toyoda | B60W 50/085 |
| 2024/0185445 A1 | 6/2024 | Duan et al. | |

\* cited by examiner

AUTOMATED ADJUSTMENT OF VEHICLE DIRECTION BASED ON ENVIRONMENT ANALYSIS

CROSS-REFERENCE TO RELATED APPLICATION

This application claims priority to U.S. Provisional Patent Application No. 63/371,370 titled "DYNAMICALLY DETERMINING VEHICLE MOTION" and filed on Aug. 12, 2022, the disclosure of which is hereby incorporated herein by reference in its entirety.

BACKGROUND

Technical Field

The present disclosure relates to autonomous driving, and more particularly, to autonomous selection of driving direction.

Description of Related Art

Generally described, a variety of vehicles, such as electric vehicles, combustion engine vehicles, hybrid vehicles, etc., can be configured with various control components that can be configured to facilitate operation. More specifically, vehicles may include one or more control components that facilitate the operation of the vehicle. Illustratively, one such control component can include components that can cause the modification of operational controls of the vehicle, such as transmission settings, throttle settings, and the like.

Vehicles can often include hardware and software functionality that facilitates location services or can access computing devices that provide location services. For example, a control component on a vehicle may be configured to determine an approximated location of the vehicle utilizing external information sources, such as global positioning system ("GPS") sources, Wireless Local Area Networks (WLAN) access point information sources, Bluetooth information sources, radio-frequency identification (RFID) sources, and other location information available. Still, further, vehicles can also include vision systems that facilitate the recognition of environmental objects within proximity to the vehicle.

DETAILED DESCRIPTION

Introduction

Figure 1A:
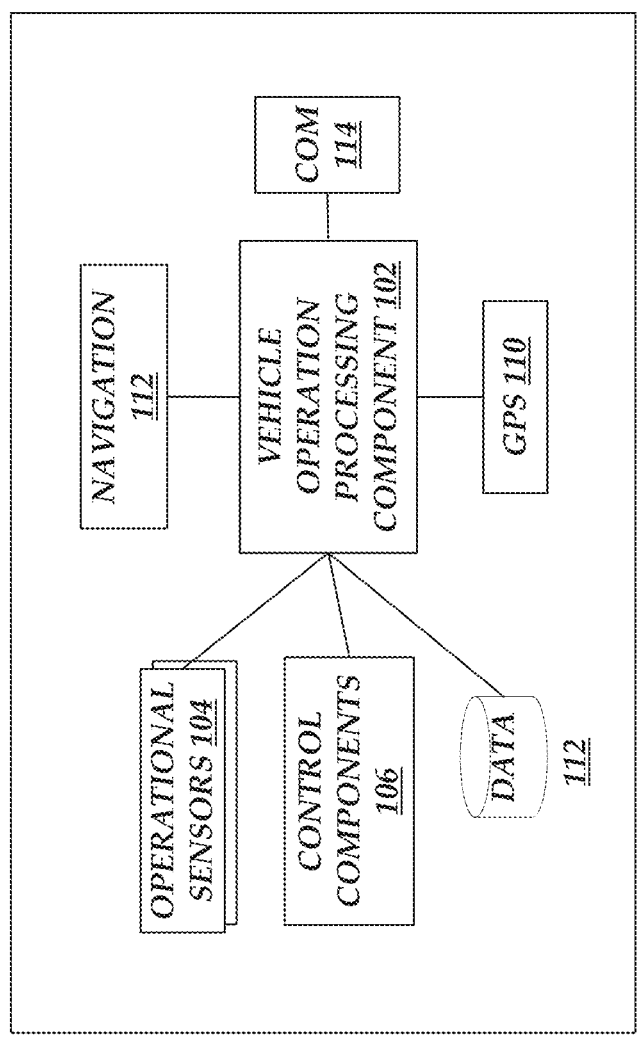
FIG. 1A is a block diagram illustrating an example autonomous or semi-autonomous vehicle, which includes a multitude of image sensors and an example processor system.

Generally described, one or more aspects of the present disclosure relate to the configuration and implementation of an automated vehicle driving mode selection. By way of the illustrative example, aspects of the present application relate to automatically selecting a vehicle driving direction such as forward or reverse (referred to herein as a driving mode). For example, a system included in a vehicle may determine a direction in which a driver is likely to prefer when switching the car from park (also referred to herein as anticipating vehicle motion). As an example, if the driver gets into his/her vehicle which is parked in a parking lot the system may determine that reverse is the likely preference. As another example, if the driver temporarily parks the vehicle at a stop light to adjust certain settings, then the vehicle may determine that forward is to be used.

The technique for choosing the driving mode can differ based on the vehicle type. For instance, in an electric vehicle, the driving mode may be set based on a drive inverter. As an example, the driving mode may be set based on supplying electrical power to the motor for forward motion, or by changing the polarity of the power source for reverse motion. In vehicles with combustion engines, the driving mode can be modified by selecting the transmission gear of the vehicle to either drive forward or reverse. This application is not limited to specific types of vehicles, and the selection method for the driving mode can differ accordingly. As such, this application can streamline the process and reduce the time required to initiate vehicle operation.

In accordance with aspects of the present application, the disclosed system processes a set of inputs, including location or navigation systems, vehicle operational sensors, vision systems, and other sensors/values to characterize the availability of the vehicle to begin travel/operation and the intent of the driver to begin vehicle travel/operation. Other aspects of the present application relate to confirming the vehicle driver's intention to continue with the initiated operation/travel of the vehicle. For example, the vehicle occupant can utilize the throttle control, brake, or a user interface to indicate the driver's intention.

As may be appreciated, objects may be in proximity to a vehicle during operation of the vehicle. In some embodiments, the driving mode may be selected to initiate vehicle operation and avoid the obstacles. For instance, when a vehicle is parked in a parking spot, there may be obstacles, such as other vehicles or objects, situated close to the boundaries of the parking space. As an example, parking bollards may be positioned to the sides and front of the vehicle. Thus, the vehicle may select a reverse direction to avoid these bollards and allow the vehicle to drive out of the parking spot. Similarly, when parked on the street, there might be cones, debris, parking meters, and other objects around. Thus, the vehicle may select an appropriate driving direction to allow the driver to safely drive away.

The vehicle described herein may use image sensors that are positioned about the vehicle to provide 360-degree image data of the vehicle's surroundings. The vehicle may use machine learning techniques to identify objects proximate to the vehicle. In some embodiments, the machine learning techniques may identify objects which are below a threshold height. Example threshold heights may include the height of the vehicle, the height of the vehicle plus a threshold distance (e.g., 0.5 meters, 1 meter). Example threshold heights may further include 0.75 meters, 1 meter, 1.2 meters, 1.5 meters, 2.5 meters, and so on. In this way, the vehicle may ensure that objects which pose a risk of hitting the vehicle may be identified.

The machine learning model described herein determines the occupancy of objects in three-dimensional space. For example, and as described in U.S. Prov. Patent App. No. 63/375,199, which is incorporated herein by reference in its entirety, the machine learning model may separate three-dimensional space into voxels which each occupying a portion of the space. The model may then indicate, at least, whether the voxel is occupied by an object. In this way, the model determines the voxels which form each object physically present in a real-world environment. Thus, oddly shaped objects, or objects which have extending members (e.g., a truck with a ladder hanging out the back), may be accurately mapped as occupying space in the voxels.

The above-described machine learning model may be used, in some embodiments, to inform the driving direction of a vehicle. For example, the vehicle may determine that objects in the front of the vehicle are blocking or greater than objects in the rear direction.

Traditionally, vehicles implement a manual process in which a driver is required to configure desired operational parameters of the vehicle by manually engaging (e.g., shifting) the vehicle mode controller (e.g., shift gear) into a certain position (e.g., forward or reverse position). With respect to autonomous driving, the autonomous driving may not be enabled until after the driver completes the manual process of determining and selecting the vehicle model controller. Thus, such systems may not be independently capable of providing functionality associated with the automated characterization of vehicle operating mode to begin the vehicle operation. Moreover, manually selecting the vehicle's operating mode to initiate operation could potentially lead to unforeseen outcomes due to human error. For instance, a driver might accidentally choose the forward-driving mode when an object is situated directly in front of the vehicle. In such a situation, if the driver persists in operating the vehicle, there is a risk of the vehicle colliding with the object.

To address at least a portion of the above deficiencies, aspects of the present application correspond to the automated vehicle operating mode selection system. More specifically, aspects of the present application relate to the automated vehicle operating mode selection system by anticipating the driver's intention. In some embodiments, the driver's intention can be anticipated based on driver behavior. Example behavior may include actions the driver has taken. For example, the driver may have exited the vehicle to plug in a charging cable. As another example, the driver may have parked and walked away from the vehicle. In this example, the vehicle may determine a forward or reverse direction based on objects positioned about the vehicle. However, the driver may have pulled onto the side of a road an temporarily parked. Thus, the vehicle may determine that the forward direction is preferred since reversing may be unsafe.

The disclosed technology may, in some embodiments, determine whether the vehicle is in an initial shift (referred to herein as an initial mode) or subsequent shift (referred to herein as a subsequent mode). For example, the initial shift may indicate a first shift associated with a driving cycle (e.g., a cycle may represent a period of vehicle operation). An example initial shift may include the driver getting into his/her vehicle after charging the vehicle. As may be appreciated, charging may represent a length of time such which is sufficient to start a new drive. Similarly, an initial shift may include the driver walking away from his/her vehicle (e.g., determined based on image data, proximity data associated with the driver's mobile device, and so on). An initial shift may also be based on passage of time (e.g., a threshold time since the driver left the vehicle, a threshold time since the vehicle was placed into park, and so on). In contrast, a subsequent shift may indicate a continuance of driving behavior after a park. For example, and as described above, the driver may have temporarily pulled off onto the side of the road. The disclosed technology may, in some embodiments, be more likely to determine a rear direction for initial shifts as compared to subsequent shifts. For example, the disclosed technology may be designed to be more hesitant to recommend reversing for subsequent shifts.

In some embodiments, determining a driving direction is based on a confidence level associated with each vehicle operating mode. For instance, and as described above, during the initial mode, such as when a vehicle is parked, the vehicle (e.g., the system or vehicle operation processing component which are described herein interchangeably) may have a higher confidence level in selecting the reverse vehicle operating mode than during the subsequent mode. This could be a situation where the vehicle is stopped in a roadway or intersection, where the vehicle operation processing component might have a lower confidence level in selecting the reverse vehicle operating mode. Furthermore, the application of the confidence level can vary based on the vehicle's current surroundings. For instance, when the vehicle is parallel parked, the confidence level assigned to detected surrounding objects is equal. This means that if the object detected in front of the vehicle is further away than the object detected at the rear, the vehicle operation processing component may select a forward vehicle operating mode. However, in a scenario where the vehicle is approaching a charging station (e.g., when the charging port is located at the rear of the vehicle), the weight of confidence level for an object detected at the front is lowered. As a result, the vehicle operation processing component selects the reverse vehicle operating mode to move the vehicle closer to the charging station.

In some instances, the vehicle operation processing component may select the vehicle operating mode based on the history of the vehicle's movement. For example, if a vehicle entered a parking spot from the south, the vehicle operation processing component might select the reverse vehicle operating mode with steering towards the north when determining the vehicle operating mode. Once the vehicle has moved in the reverse and north direction, the vehicle operation processing component may select the forward direction, enabling the vehicle to move towards the south—the direction from which it initially entered the parking spot.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable to various types of vehicles, including vehicles with different propulsion systems, such as combination engines, hybrid engines, electric motors, and the like. Still, further, aspects of the present application may be applicable to various types of vehicles that can incorporate different types of sensors, sensing systems, navigation systems, or location systems. Accordingly, the illustrative examples should not be construed as limiting. Similarly, aspects of the present application may be combined with or implemented with other types of components that may facilitate the operation of the vehicle, including autonomous driving applications, driver convenience applications, and the like. In this regard, utilization of terminology in the illustrative example, such as "driver," "occupant," "operation," "travel," etc., should not be construed as being limited to any particular methodology for the use of a vehicle.

FIG. 1A illustrates an environment of a vehicle that corresponds to processing inputs generated from local sensors included in the vehicle. The environment includes a collection of local sensor inputs that can provide inputs for the operation of the vehicle or collection of information as described herein. The collection of local sensors can include one or more sensor or sensor-based systems included with a vehicle or otherwise accessible by a vehicle during operation. The local sensors or sensor systems may be integrated into the vehicle. Alternatively, the local sensors or sensor systems may be provided by interfaces associated with a vehicle, such as physical connections, wireless connections, or a combination thereof.

Processing of sensor inputs may determine the availability of the vehicle to begin operation/travel and to further characterize the intent of at least one occupant to initiate operation/travel in accordance with one or more aspects of the disclosed technology. The environment includes a collection of local sensor inputs that may be utilized to determine whether the vehicle is available or not available to begin travel/operation. Additionally, the local sensor inputs may be utilized to further characterize whether occupants in the vehicle are prepared and intend to begin operation/travel.

In one aspect, the local sensors can include one or more positioning systems that can obtain reference information from external sources that allow for various levels of accuracy in determining positioning information for a vehicle. For example, positioning systems can include various hardware and software components for processing information from GPS sources (e.g., GPS 110), Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle. In other embodiments, the positioning systems can also determine travel-related operational parameters by utilizing input generated from the operational sensors 104, such as direction of travel, velocity, acceleration, and the like. The positioning system may be configured as part of a vehicle for multiple purposes including self-driving applications, enhanced driving or user-assisted navigation, and the like. Illustratively, the positioning systems can include processing components and data 112 that facilitate the identification of various vehicle parameters as described herein.

In still another aspect, the local sensors can include one or more navigations system 112 for identifying navigation related information. Illustratively, the navigation systems can obtain positioning information from positioning systems and identify characteristics or information about the identified location, such as elevations, road grades, routes, road obstacles, traffic, etc. The navigation systems can also identify suggested or intended lane locations in a multi-lane road based on directions that are being provided or anticipated for a vehicle user. Similar to location systems, the navigation system may be configured as part of a vehicle for multiple purposes, including self-driving applications, enhanced driving or user-assisted navigation, and the like. The navigation systems may be combined or integrated with positioning systems. Illustratively, the positioning systems can include processing components and data 112 that facilitate the identification of various vehicle parameters as described herein.

The local resources further include a vehicle operation processing component 102 that may be hosted on the vehicle or a computing device accessible by a vehicle (e.g., a mobile computing device). The vehicle operation processing component 102 can illustratively access inputs from various local sensors or sensor systems and process the inputted data 112 as described herein. The vehicle operation processing component can illustratively process inputs from a combination of positioning systems, navigation systems, and other vehicle operational parameters to dynamically determine/characterize the availability for the vehicle to begin operation/travel and to determine/characterize the intent of at least one vehicle occupant to begin such travel. The vehicle operation processing component can also determine one or more operational parameters to cause the vehicle to implement the desired travel/operation. Illustrative components of a vehicle operation processing component will be described with regard to FIG. 2.

The environment can further include various additional sensor components or sensing systems operable to provide information regarding various operational parameters of the vehicle for use in determining or characterizing the availability for the vehicle to begin operation/travel and to determine/characterize the intent of at least one vehicle occupant to begin such travel in accordance with one or more aspects of the present application. Illustratively, in one embodiment, the additional sensor components can include sensors for measuring or determining the longitudinal acceleration of the vehicle. The longitudinal acceleration input may be utilized to determine when a vehicle may be prepared to travel, such as by measuring the loading of the vehicle, onboarding of occupants, etc.

In another embodiment, the additional sensor components can include sensors for measuring or determining when doors have been closed/latched, seatbelts have been closed/latched, occupants are in seats, and the like. The additional sensor components can also include sensors for determining various operational parameters of the vehicle, such as operational status of brake pedals, throttle pedals, emergency brakes, keys/wireless access components, and the like. The additional sensor components can include information from other systems included or integrated into the vehicle, such as vision systems, user interface systems, and the like.

The environment can further include one or more control components for processing outputs from the vehicle operation processing component. In one embodiment, the control components 106 can include control components for causing the implementation of determined operational parameters. In one example, the control components 106 can cause the selection of a vehicle operating mode, setting/parameter corresponding to the initiation of travel, such as placing the vehicle in a specific drive direction. In another example, the control components can cause the orientation/manipulation of the direction controls to cause a change in the direction of the vehicle upon beginning operation/travel. In still another example, the control components can cause the selection of an operational parameter for throttle controls that corresponds to one or more throttle levels in operation/travel. Other embodiments of control components can include, but are not limited to, suspension control components, collision avoidance components, and the like.

In some embodiments, the vehicle operation processing component 102, by utilizing the processor system 130, determines surrounding obstacles (e.g., objects) by generating a 3-dimensional view or occupancy grid. Description related to identifying objects is included below, with respect to FIGS. 1C-1D.

The vehicle operation processing component 102 may determine the current vehicle mode—either initial or subsequent mode—based on changes in the vehicle operating mode (e.g., shifting) within a driving cycle. A driving cycle can be defined as a period of vehicle operation, such as the interval between the time the vehicle is turned on and turned off. For example, if no vehicle operating mode is selected during the cycle, the mode corresponds to the initial mode. If a vehicle operating mode selection is made during the cycle, any subsequent vehicle operating mode selection aligns with the subsequent mode. In some embodiments, the vehicle operation processing component 102 may select the vehicle operating mode based on the confidence level of each vehicle operating mode. For example, during the initial mode, the confidence level for selecting forward or reverse direction mode can be based on the objects surrounding the vehicle. However, during the subsequent mode, the confidence level for each vehicle operating mode can be selected based on the previous vehicle operating mode. For example, when the vehicle was operating in the forward direction and stopped, the vehicle operating mode in the forward direction can have a higher confidence level. In one scenario, when the vehicle was in reverse direction operating mode to charge the car and the driver exited the vehicle and entered the vehicle again, the vehicle operation processing component 102 may determine as the subsequent mode. In this scenario, when the driver intends to operate the vehicle (e.g., by pressing the brake pedal), the vehicle operation processing component 102 may select the reverse direction vehicle operating mode because the reverse direction vehicle operating mode has a higher confidence level than the forward direction vehicle operating mode.

The vehicle operation processing component 102 may utilize the determined current vehicle mode in determining the vehicle operating mode selection. In certain embodiments, the vehicle operation processing component 102 selects the vehicle operating mode based on the acquired data, such as object detection data and/or object occupancy information around the vehicle. In these instances, the vehicle operation processing component 102 may select the vehicle operating mode based on the vehicle mode. For example, if the current vehicle mode is in the initial mode and the vehicle is parked in a parking lot, the vehicle operation processing component 102 may shift the vehicle operating mode based on the acquired data. If an object is detected in front of the vehicle, for instance, the vehicle operation processing component 102 may select the reverse vehicle operating mode. Conversely, if the current vehicle mode is in a subsequent mode and, for example, the vehicle is stopped in front of a garage door, the vehicle operation processing component 102 may select the vehicle operating mode to the forward. Thus, during the subsequent mode, the vehicle operation processing component 102 may select the previous vehicle operating mode. In another scenario, the vehicle can be parked (e.g., reverse facing) to charge the vehicle. In this scenario, when a driver left the vehicle and entered the vehicle again to operate the vehicle, the vehicle operation processing component 102 may identify the vehicle operating mode as the subsequent mode and may automatically select reverse direction, the previously selected vehicle operating mode.

In some embodiments, the vehicle operation processing component 102 may identify objects surrounding the vehicle based on images captured by a set of cameras installed in the vehicle 100.

Figure 1B:
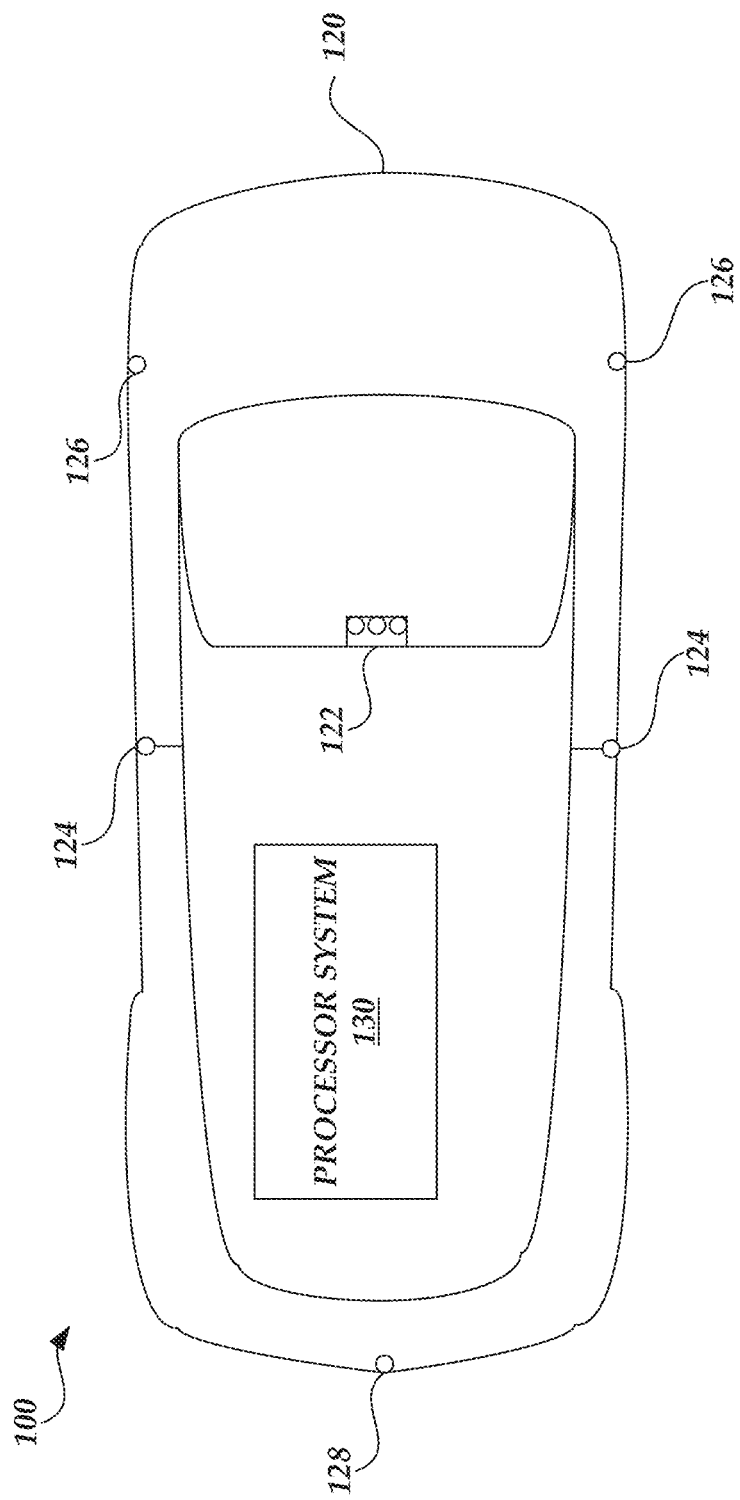
FIG. 1B illustrates a system for a vehicle in accordance with one or more aspects of the present application

As illustrated in FIG. 1B, the set of cameras can include a set of front-facing cameras 122 that capture image data. The front facing cameras may be mounted in the windshield area of the vehicle 100 to have a slightly higher elevation. As illustrated in FIG. 1B, the front facing cameras 122 can include multiple individual cameras configured to generate composite images. For example, the camera housing may include three image sensors which point forward. In this example, a first of the image sensors may have a wide-angled (e.g., fisheye) lens. A second of the image sensors may have a normal or standard lens (e.g., 35 mm equivalent focal length, 50 mm equivalent, and so on). A third of the image sensors may have a zoom or narrow lens. In this way, three images of varying focal lengths may be obtained in the forward direction by the vehicle. The vehicle 100 further includes a set of cameras 124 mounted on the door pillars of the vehicle. The vehicle 100 can further include two cameras 126 mounted on the front bumper of the vehicle. Additionally, the vehicle 100 can include a rearward facing camera 128 mounted on the rear bumper, trunk or license plate holder.

Figure 1C:
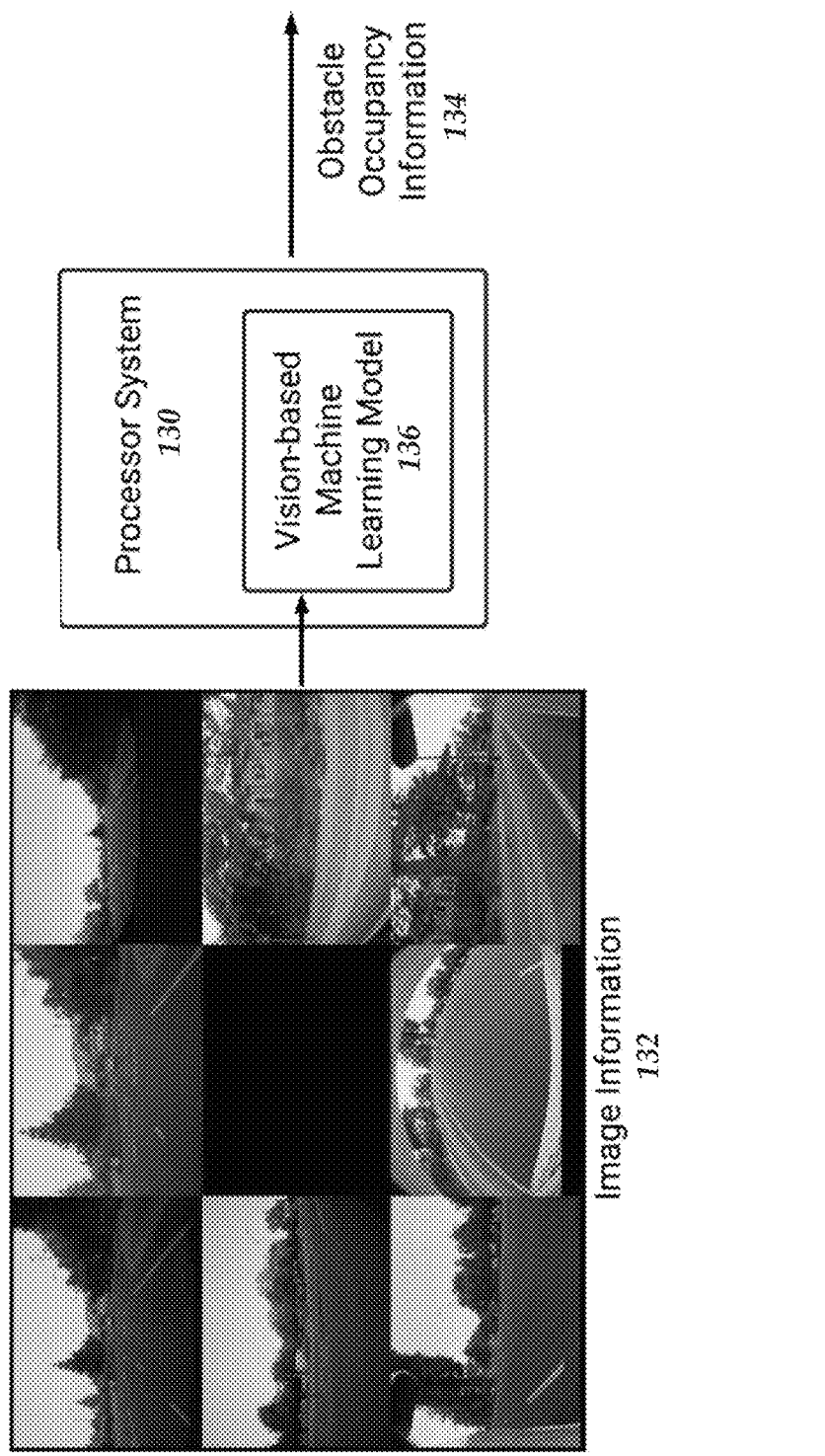
FIG. 1C is a block diagram illustrating an example processor system determining object obstacle information based on received image information from the example image sensors.

FIG. 1C is a block diagram illustrating an example processor system 130 determining obstacle occupancy information 134 based on received image information 132 from the example image sensors described above. The example processor system 130 may represent the vehicle operation processing component 102 described herein.

The image information 132 includes images from image sensors positioned about a vehicle (e.g., vehicle 120). In the illustrated example of FIG. 1B, there are 8 image sensors and thus 8 images are represented in FIG. 1C. For example, a top row of the image information 132 includes three images from the forward-facing image sensors 122. As described above, the image information 132 may be received at a particular frequency such that the illustrated images represent a particular time stamp of images. In some embodiments, the image information 132 may represent high dynamic range (HDR) images. For example, different exposures may be combined to form the HDR images. As another example, the images from the image sensors may be pre-processed to convert them into HDR images (e.g., using a machine learning model).

In some embodiments, each image sensor may obtain multiple exposures each with a different shutter speed or integration time. For example, the different integration times may be greater than a threshold time difference apart. In this example, there may be three integration times which are, in some embodiments, about an order of magnitude apart in time. The processor system 130, or a different processor, may select one of the exposures based on measures of clipping associated with images. In some embodiments, the processor system 130, or a different processor may form an image based on a combination of the multiple exposures. For example, each pixel of the formed image may be selected from one of the multiple exposures based on the pixel not including values (e.g., red, green, blue) values which are clipped (e.g., exceed a threshold pixel value).

The processor system 130 may execute a vision-based machine learning model engine 136 (also referred to herein as the occupancy network 150) to process the image information 132. An example of the vision-based machine learning model is described in more detail below, with respect to FIGS. 1C-1D. As described herein, the vision-based machine learning model may combine information included in the images. For example, each image may be provided to a particular backbone portion. In some embodiments, the backbone portions may represent convolutional neural networks which extract features (e.g., high-dimensional features in image space). Outputs of these backbone networks may then, in some embodiments, be combined (e.g., formed into a tensor) or may be provided as separate tensors to one or more further portions of the model. In some embodiments, an attention portion (e.g., cross-attention) may receive the combination. The attention portion queries 3D points for whether the 3d point is occupied or not. The attention portion produces 3d occupancy features and may be provided, for example, to an upsampling portion (e.g., deconvolutions) to produce denser features.

The combined output may then be used to determine disparate obstacle occupancy information 134 associated with a real-world environment. Example information may include an indication of voxels which have objects detected therein. For example, objects may be represented as voxels which encompass a volume of space. Thus, and as an example, a curb may be represented as extend one or more voxels upwards (e.g., in the z-direction) and along a length of the curb. Similarly, a truck may be represented as voxels. Advantageously, a portion of the truck (e.g., lumber or a ladder extending from the back) may be captured as the portion represents an object which is converted into voxels.

Figure 1D:
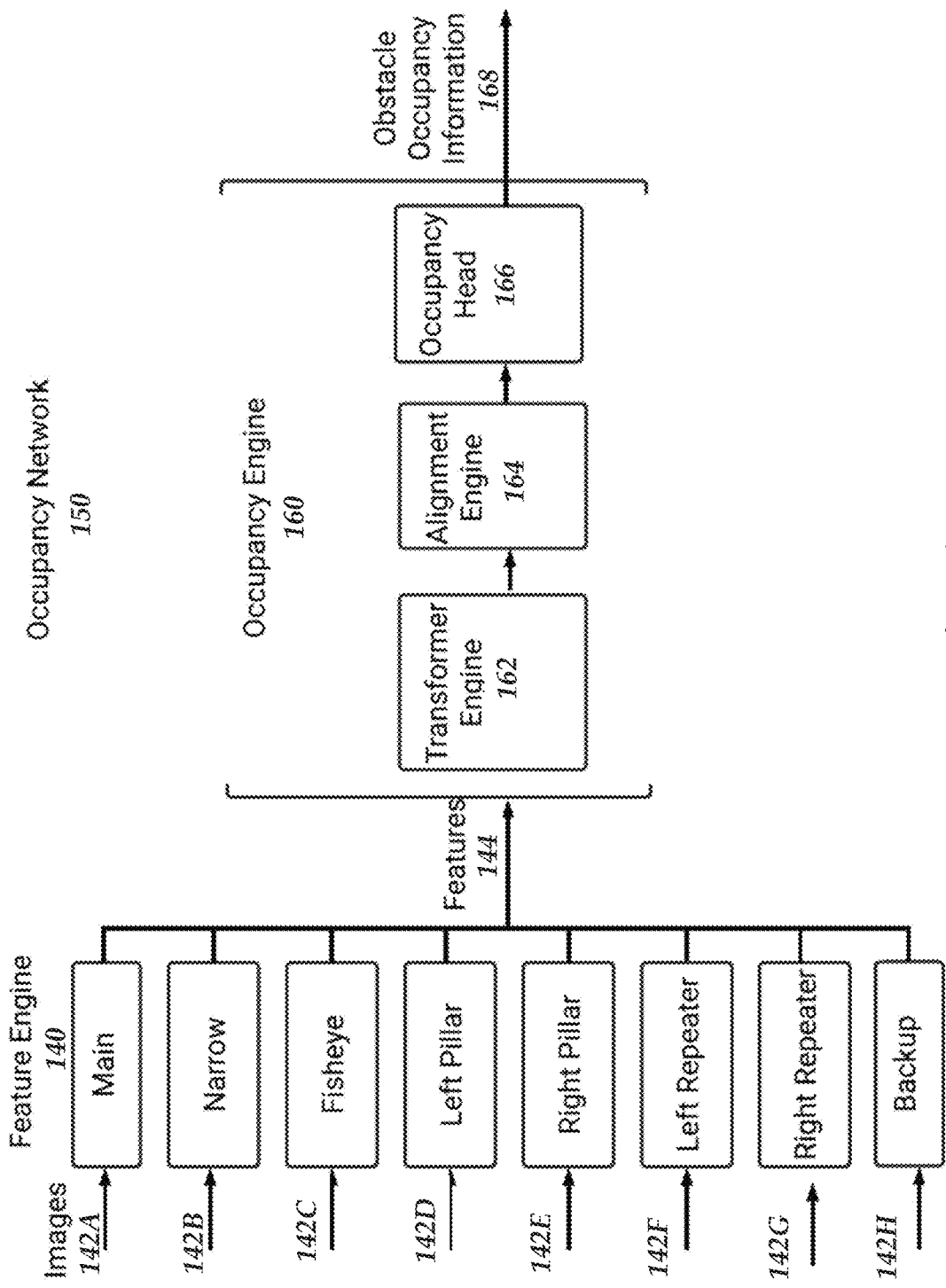
FIG. 1D is a block diagram illustrating detail of an example occupancy network outputting obstacle occupancy information.

FIG. 1D is a block diagram illustrating detail of an example occupancy network 150 outputting obstacle occupancy information 168. The example model may be executed by an autonomous vehicle, such as vehicle 120. Thus, actions of the model may be understood to be performed by a processor system included in the vehicle.

In the illustrated example, images 142A-142H are received by the occupancy network 150. These images 142A-142H may be obtained from image sensors positioned about the vehicle, such as image sensors 130, 124, 126, and 128. The occupancy network 150 feature engines 140 (e.g., backbone portions), which receive respective images as input. Thus, the feature engines 140 process the raw pixels included in the images 142A-142H. In some embodiments, the feature engines 140 may be convolutional neural networks. For example, there may be 5, 10, 15, and so on, convolutional layers in each backbone network. In some embodiments, the feature engines 140 may include residual blocks, recurrent neural network-regulated residual networks, and so on. Additionally, the feature engines 140 may include weighted bi-directional feature pyramid networks (BiFPN). The output of the BiFPNs may represent multiscale features determined based on the images 142A-142H. In some embodiments, Gaussian blur may be applied to portions of the images at training and/or inference time. For example, road edges may be peaky in that they are sharply defined in images. In this example, a Gaussian blur may be applied to the road edges to allow for bleeding of visual information such that they may be detectable by a convolutional neural network.

Additionally, certain of the feature engines 140 may pre-process the images such as performing rectification, cropping, and so on. With respect to cropping, images 142C from the fisheye forward-facing lens may be vertically cropping to remove certain elements included on a windshield (e.g., a glare shield).

With respect to rectification, the vehicles described herein may be examples of vehicles which are available to millions, or more, end-users. Due to tolerances in manufacturing and/or differences in use of the vehicles, the image sensors in the vehicles may be angled, or otherwise positioned, slightly differently (e.g., differences in roll, pitch, and/or yaw). Additionally, different models of vehicles may execute the same machine learning model. These different models may have the image sensors positioned and/or angled differently. The occupancy network 150 described herein may be trained, at least in part, using information aggregated from the vehicle fleet used by end-users. Thus, differences in point of view of the images may be evident due to the slight distinctions between the angles, or positions, of the image sensors in the vehicles included in the vehicle fleet.

Thus, rectification may be performed to address these differences. For example, a transformation (e.g., an affine transformation) may be applied to the images 142A-142H, or a portion thereof, to normalize the images. In this example, the transformation may be based on camera parameters associated with the image sensors (e.g., image sensors 102A-102F), such as extrinsic and/or intrinsic parameters. In some embodiments, the image sensors may undergo an initial, and optionally repeated, calibrated step. For example, as a vehicle drives the cameras may be calibrated to ascertain camera parameters which may be used in the rectification process. In this example, specific markings (e.g., road lines) may be used to inform the calibration. The rectification may optionally represent one or more layers of the feature engines 140, in which values for the transformation are learned based on training data.

The feature engines 140 may thus output feature maps (e.g., tensors) which are used downstream in the network 150. In some embodiments, the output from the feature engines 140 may be combined into a matrix or tensor. In some embodiments, the output may be provided as a multitude of tensors (e.g., 8 tensors in the illustrated example). In the illustrated example, the output is referred to as features 144 which is input into the occupancy engine 160. While the feature engines 140 and occupancy engine 160 are illustrated separately, in some embodiments, they may form part of the same network or model (e.g., the occupancy network 150). Additionally, in some embodiments, the feature engines 140 and occupancy engine 160 may be end-to-end trained.

The occupancy engine 160 may use the features 144 to determine occupancy associated with objects positioned around the vehicle. For example, the occupancy engine 160 may separate the real-world environment into voxels which extend from a ground portion upwards in three-dimensional space. Each voxel may represent a portion of three-dimensional space, such as a cuboid or other three-dimensional shape. An object, or real-world feature, may be represented as a combination of voxels. For example, a truck may be represented as a combination of voxels that form the volume of the truck as it exists in the real-world environment. Similarly, a bollard may be represented as a combination of voxels. Additionally, a curb or sidewalk may be represented as the combination of voxels with sufficient detail to determine changes in elevation of the curb (e.g., due to root growth of a tree, a prior earthquake, and so on).

The occupancy engine 160 therefore determines occupancy in three-dimensions based on the input image features from the feature engines 140. The occupancy engine 160 includes a transformer engine 162 that uses query-based attention to determine three-dimensional occupancy features. Output from the transformer engine 162 is provided to the alignment engine 164. To ensure that objects can be tracked as an autonomous vehicle navigates, even while temporarily occluded, the alignment engine 164 queues output from the transformer engine 162. The queued output may be used to track objects by aligning the occupancy features from the queue. For example, the output may be pushed into a queue according to time and/or space. In this example, the time indexing may indicate that the engine 162 stores output based on passage of time (e.g., information is pushed at a particular frequency). Spatial indexing may indicate that the engine 162 stores output based on spatial movement of the vehicle. The alignment engine 164 may additionally include a video module which performs three-dimensional convolutions to track objects. In some embodiments, kinematic information associated with the vehicle may be used as input to the alignment engine 164.

Output from the alignment engine 164 may be provided to the occupancy head 166 to determine obstacle occupancy information 134. Example output from the head 166 may include an indication of occupancy associated with voxels. Additional detail related to the occupancy network 150 is included in U.S. Prov. Patent App. No. 63/375,199, which is incorporated herein by reference in its entirety.

The obstacle occupancy information 168 may be generated via a forward pass through the occupancy network 166. In some embodiments, forward passes may be computed at a particular frequency (e.g., 24 Hz, 30 Hz, and so on).

Figure 2:
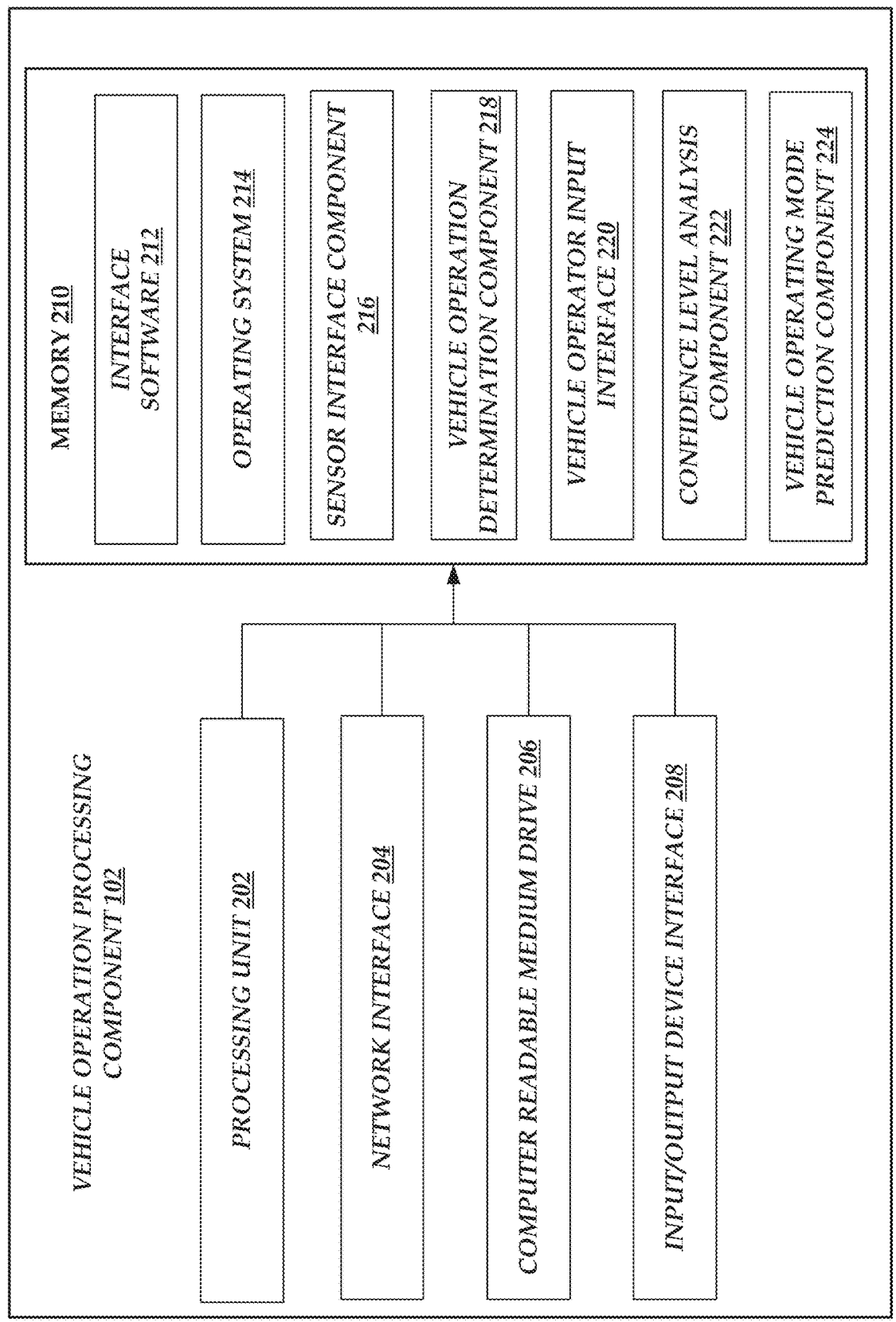
FIG. 2 is an example architecture of a vehicle operation processing component.

With reference now to FIG. 2, an illustrative architecture for implementing the vehicle operation processing component 102 on one or more local resources or a network service will be described. The vehicle operation processing component 102 may be part of components/systems that provide functionality associated with the operation of driving or travel components, suspension components, etc. In other embodiments, the vehicle operation processing component 102 may be a stand-alone application that interacts with other components, such as local sensors or sensor systems, signal interfaces, etc.

The architecture of FIG. 2 is illustrative in nature and should not be construed as requiring any specific hardware or software configuration for the vehicle operation processing component. The general architecture of the vehicle operation processing component depicted in FIG. 2 includes an arrangement of computer hardware and software components that may be used to implement aspects of the present disclosure. As illustrated, the vehicle operation processing component 102 includes a processing unit 202, a network interface 204, a computer readable medium drive 206, and an input/output device interface 208, all of which may communicate with one another by way of a communication bus. The components of the vehicle operation processing component 102 may be physical hardware components or implemented in a virtualized environment.

The network interface 204 may provide connectivity to one or more networks or computing systems, such as the wired or wireless network within the vehicle. The processing unit 202 may thus receive information and instructions from other computing systems or services via the in-vehicle network. The processing unit may also communicate to and from memory and further provide output information for an optional display via the input/output device interface. In some embodiments, the vehicle operation processing component 102 may include more (or fewer) components than those shown in FIG. 2, such as implemented in a mobile device or vehicle.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit in the general administration and operation of the vehicle operation processing component 102. The memory 210 may further include computer program instructions and other information for implementing aspects of the present disclosure. For example, in one embodiment, the memory 210 includes a sensor interface component 216 that obtains information from various sensors or sensing systems, such as navigational systems, positional systems, vehicle operational parameter systems, and the like. In some embodiments, the sensor interface component 216 obtains the obstacle occupancy information 134 generated from the processor system 130 by utilizing the vision-based machine learning model 136, as described in FIG. 1C. The sensor interface component 216 may also obtain obstacle occupancy information 168 by utilizing the occupancy engine 160, as described in FIG. 1D.

The memory 210 further includes a vehicle operation determination component 218 for determining current vehicle mode. The vehicle operation determination component 218 may determine the current vehicle mode—either initial or subsequent mode—based on changes in the vehicle operating mode (e.g., shifting) within a driving cycle. A driving cycle can be defined as a period of vehicle operation, such as the interval between the time the vehicle is turned on and turned off. For example, if no vehicle operating mode is selected during the cycle, the mode corresponds to the initial mode. If a vehicle operating mode selection is made during the cycle, any subsequent vehicle operating mode selection aligns with the subsequent mode. Illustratively, the initial mode may represent an example scenario where the vehicle is stationary, and the driver is about to initiate the operation (e.g., by activating the vehicle's power system or engine). This could be associated with a situation where the vehicle is parked, and the driver is preparing to operate it. In some scenarios, the initial mode can correspond to when a charger has been connected to the vehicle. Additionally, the initial mode can correspond to if the driver left the vehicle more than a predefined time duration. On the other hand, the subsequent mode may correspond to a subsequent vehicle operation within a driving cycle. The subsequent mode may represent an example scenario where the vehicle has been operated and temporarily halted. This could be related to a scenario where the vehicle was being driven on a public road and the driver temporarily stopped it on the sideline.

The memory 210 further includes a vehicle operator input interface 220 for receiving input from the vehicle operator (e.g., driver). The vehicle operator input interface 220 may receive the input in various medium, such as by sensing vehicle's physical movement (e.g., door enclosure, window closure, driver seat adjustment, etc.), identifying vehicle operational input (e.g., detecting brake pedal or accelerator pressure, pressing horn, etc.), identifying vehicle authentication information (e.g., detecting vehicle key, authentication card, etc.), and the like. In some embodiments, the vehicle operator input interface 220 may provide a user interface. Illustratively, the user interface can be provided via the vehicle infotainment system display. The sub function of the user interface can be associated with, but is not limited to, providing vehicle path, current vehicle position, autonomous enabling/disabling functionality, surrounding view, navigation information, map, etc. In some scenarios, the driver may provide intended vehicle path or point by pressing or touching a portion of the displayed map. The vehicle operator input interface 220 may also provide the vehicle operating mode selection. Illustratively, when the driver press the intended vehicle operating mode, this selection may override the current selected vehicle operating mode.

The memory 210 can further include a data analysis component 222 for analyzing the received data at the sensor interface component 216 and/or vehicle operator input interface 220. While description below describes adjusting confidence of data, such as confidence of objects detected in a certain direction, in some embodiments the system does not use confidence values of data. Instead, the system uses detected objects as a signal, amongst other signals (e.g., user actions, navigation data, scenarios, map data, and so on), as described herein. In certain embodiments, the vehicle operation processing component 102 predicts the vehicle's operating mode by analyzing the received data and determining the confidence value for each segment of the data. For instance, when the vehicle is parked parallel to other cars in front and behind it, the data analysis component 222 evaluates the confidence value of the detection data received from both the front and rear detection sensors. In this scenario, the confidence values are equally weighted. Therefore, if the front sensor detects a car, but the rear sensor does not, the data analysis component 222 may infer that the vehicle can safely move in reverse. In some embodiments, the confidence value varies depending on the detected distance between the vehicle and surrounding objects; a shorter distance results in a higher confidence value. For example, if the detected distances to the parked cars in front and behind are 3 m and 10 m, respectively, the data analysis component 222 may conclude that there is a higher confidence value in the distance to the front parked car. As a result, it may suggest that the vehicle can safely move in reverse.

In some embodiments, the data analysis component 222 calculates the confidence value of the incoming data based on its association with the current vehicle mode either initial or subsequent—as determined by the vehicle operation determination component 218. During the initial mode, such as when the vehicle is parked, the data analysis component 222 assigns equal weight to all received data. This means that if objects are detected both in front and at the rear of the vehicle, the data analysis component 222 evaluates the data from both directions with equal confidence. However, in the subsequent mode, when the vehicle is temporarily halted on the road, the data analysis component 222 assigns a lower confidence value weight to data about objects detected at the rear of the vehicle. As a result, the data analysis component 222 may produce an instruction for the vehicle to wait and proceed forward once the path in front is clear.

In some embodiments, the data analysis component 222 analyzes the various data received in sensor interface component 216. Illustratively, the data analysis component 222 may have a high confidence weight on the data received from the navigation system. For example, the data analysis component 222 may determine whether the vehicle is parallel parked based on navigation information. In some embodiments, the data analysis component 222 provides higher confidence value weight on the autonomous driving. Thus, in some scenarios, the autonomous driving may override the data generated by the vehicle operation processing component 102. In some cases, the driver input via the user interface, such as selecting a particular vehicle path, may have the higher confidence value weight, thus, the driver input may override the data generated by the vehicle operation processing component 102.

In some embodiments, the data analysis component 222 analyzes the confidence level of the vehicle operating mode selection. Illustratively, when the vehicle operation processing component 102 determines the vehicle operating mode—either forward direction or reverse direction-, the data analysis component 222 determines the confidence level for each vehicle operating mode. For example, when the vehicle is parallelly parked, the data analysis component 222 can determine the confidence level of each forward or reverse vehicle operating mode based on the distance to the surrounding object. In some embodiments, the confidence level varies based on the determined current vehicle mode. For example, during the subsequent mode, such that when the vehicle is temporarily stopped while driving in the forward direction (e.g., forward vehicle operating mode), the data analysis component 222 may have a higher confidence level to the forward direction, when the driver reinitiate the vehicle operation after the stop. In another scenario that the vehicle is parked in reverse direction and charged and the diver exited the vehicle and reentered the vehicle, the current vehicle mode can be the subsequent mode. In this scenario, when the driver reinitiates the vehicle operation, the data analysis component 222 may select the reverse direction vehicle operating mode.

The memory 210 further includes a vehicle operating mode prediction component 224 for predicting the vehicle operating mode, such as forward direction, reverse direction, or parking. In some embodiments, the vehicle operating mode prediction component 224 predicts the vehicle operating mode based on analysis results generated from the confidence analysis component 222. In some scenarios, the vehicle operating mode prediction component 224 predicts the vehicle operating mode based on the current vehicle location and surrounding vehicle environment. For example, the data analysis component 222 may determine that the vehicle is parallel parked based on the navigation information and by comparing the heading of the vehicle with the heading of the road (e.g., the heading of the vehicle and road are parallel). In this example, the vehicle operating mode prediction component 224 may predict the vehicle operating mode based on the data received at sensor interface component 216. The followings are some scenarios for predicting the vehicle operating mode at the vehicle operating mode prediction component 224. However, these scenarios are solely illustrated for the example purposes and should not be interpreted to limit the disclosed technology.

1. If the vehicle is parallel parked and equipped with ultrasonic sensors or the vision-based machine learning described herein (e.g., model 136), the vehicle operating mode prediction component 224 predicts the vehicle operating mode based on processing the inputs from the ultrasonic sensors and/or cameras. If the current vehicle mode is an initial mode, the detection data generated from the sensors is weighted with respect to each other in order to produce a simple Boolean represents whether or not a vehicle pathway is blocked, such that "blocked confidence value" for each direction. If the current vehicle mode is a subsequent mode, the vehicle operating mode prediction component 224 predicts the vehicle operating mode associated with forward direction.
2. If the vehicle is parallel parked and is not equipped with ultrasonic sensors or the vision-based machine learning model, the vehicle operating mode prediction component 224 predicts the vehicle operating mode associated with forward direction. The vehicle operating mode prediction component 224 may also utilize the autonomous driving data to predict the vehicle operating mode.

In certain embodiments, the vehicle operating mode prediction component 224 uses the vehicle's driving history (e.g., driving path) to forecast the vehicle's operating mode. This driving history can be stored in the computer-readable medium drive 206 for reference. For instance, when the vehicle is entering a parking lane, operational parameters such as wheel spin, torque, steering wheel tilt angle, and direction can be recorded. In some embodiments, the vehicle operating mode prediction component 224 forecasts the vehicle's operating mode based on these operational parameters in conjunction with location information. For example, if the vehicle operating mode prediction component 224 predicts that the vehicle is about to exit a parking lane, it will forecast the vehicle's operating mode to replicate the position and conditions when the vehicle initially entered the parking lane.

In some embodiments, the vehicle operating mode prediction component 224 predicts the vehicle operating mode by receiving input from the driver via the vehicle operator input interface. In these embodiments, the received input has the highest confidence value than the processing results of other data. Thus, the vehicle operating mode prediction component 224 may utilize the received input as the vehicle operating mode.

Although illustrated as components combined within the vehicle operation processing component, one skilled in the relevant art will understand that one or more of the components in memory may be implemented in individualized computing environments, including both physical and virtualized computing environments.

In certain embodiments, the vehicle operation processing component 102 may incorporate a machine learning model (not depicted in FIG. 2) to execute one or more functions, as detailed herein. In these scenarios, the historical data regarding vehicle operating mode selections and subsequent reselections by the driver can serve as training data for the machine learning model. For instance, when the vehicle operation processing component 102 autonomously selects a vehicle operating mode, the driver may choose to reselect the mode (for example, manually or by interrupting the vehicle operating mode selection via driver input provided to a user interface). This usage data can be supplied as retraining data for the machine learning model. Each usage instance can also be provided as retraining mode data, linked with each scenario corresponding to each usage.

Figure 3:
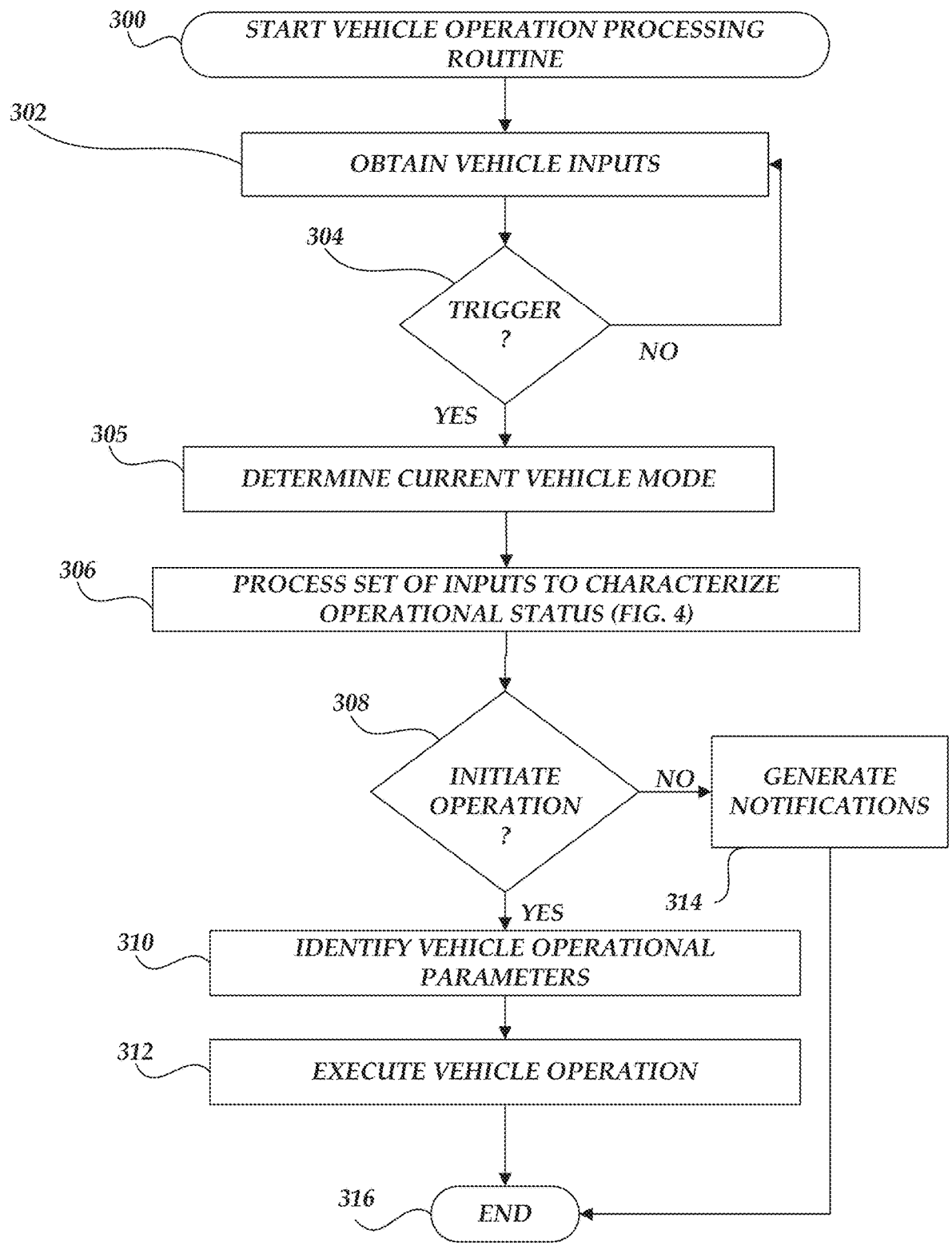
FIG. 3 is a flow diagram illustrating an example embodiment of a vehicle operation processing routine.

Turning now to FIG. 3, a flow diagram of a vehicle operation routine 300 implemented by a vehicle operation processing component, will be described. Illustratively, vehicle operation routine 300 represents a general routine for a vehicle operation processing component 102 to determine/characterize the availability for the vehicle to begin operation/travel and to determine/characterize the intent of at least one vehicle occupant to begin such travel. Additionally, vehicle operation routine 300 can be further utilized to select and implement operational parameters for a vehicle in accordance with the determined characteristics. For purposes of illustration, routine 300 will begin on the assumption that the vehicle is in the first operational state (e.g., above the threshold).

At block 302, the vehicle operation processing component 102 obtains vehicle inputs. As described above, in an illustrative embodiment, the vehicle operation processing component 102 can process inputs from a combination of one or more components that may be configured to provide navigational information, positioning information, and vehicle operational parameters. In another aspect, inputs can be provided by (or requested from) one or more positioning systems that can obtain reference information from external sources that allow for various levels of accuracy in determining positioning information for a vehicle. For example, the positioning systems can include various hardware and software components for processing information from GPS sources, Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle. In other embodiments, the positioning systems can also determine travel-related operational parameters, such as direction of travel, velocity, acceleration, and the like.

In still another aspect, inputs can be provided by (or requested by) one or more navigations system for identifying navigation related information. Illustratively, the navigation systems can obtain positioning information from positioning systems and identify characteristics or information about the identified location. For example, the navigation systems can identify current characteristics of the road, such as anticipated lane mergers, lane splits, turning lanes, etc. based on configured information. The navigation systems can also identify suggested or intended lane location in a multi-lane road based on directions that are being provided or anticipated for a vehicle user.

In further aspects, inputs can also include various operational parameters of the vehicle. Illustratively, the additional sensor components can include sensors for measuring or determining longitudinal acceleration of the vehicle. The longitudinal acceleration input may be utilized to determine when a vehicle may be prepared to travel, such as by measuring loading of the vehicle, onboarding of occupants, etc. In another embodiment, the additional sensor inputs can include inputs for sensors for measuring or determining when doors have been closed/latched, seatbelts have been closed/latched, occupants are in seats, and the like. The additional sensor inputs can also include sensors for determining various operational parameters of the vehicle, such as the operational status of brake pedals, throttle pedals, emergency brake, keys/wireless access components, and the like. The additional sensor components can include information from other systems included or integrated into the vehicle, such as vision systems, user interface systems, and the like.

In some embodiments, the vehicle operation processing component 102 obtains the obstacle occupancy information 134 generated from the processor system 130 by utilizing the vision-based machine learning model 136, as described in FIG. 1C. The vehicle operation processing component 102 may also obtain obstacle occupancy information 168 by utilizing the occupancy engine 160, as described in FIG. 1D.

In some embodiments, the vehicle operation processing component 102, upon obtaining the vehicle inputs, may determine the location of the vehicle. The identified location may include, for example, a parking area, private road, public road, charging station, garage, gate door, etc.

The sensor input may be continuously monitored or monitored based on some form of trigger, such as by sensing vehicle's physical movement (e.g., door enclosure, window closure, driver seat adjustment, etc.), identifying vehicle operational input (e.g., detecting brake pedal or accelerator pressure, pressing horn, etc.), identifying vehicle authentication information (e.g., detecting vehicle key, authentication card, etc.), and the like. At decision block 304, a test is conducted to determine whether a trigger to process the set of inputs has been received or detected. If not the routine 300 returns to block 302.

Once a trigger has been received, at block 305, the vehicle operation processing component 102 determines the current vehicle mode. The vehicle operation determination component 218 may determine the current vehicle mode—either initial or subsequent mode—based on changes in the vehicle operating mode (e.g., shifting) within a driving cycle. A driving cycle can be defined as a period of vehicle operation, such as the interval between the time the vehicle is turned on and turned off. For example, if no vehicle operating mode is selected during the cycle, the mode corresponds to the initial mode. If a vehicle operating mode selection is made during the cycle, any subsequent vehicle operating mode selection aligns with the subsequent mode. Illustratively, the initial mode may represent an example scenario where the vehicle is stationary, and the driver is about to initiate the operation (e.g., by activating the vehicle's power system or engine). This could be associated with a situation where the vehicle is parked and the driver is preparing to operate it. In some scenarios, the initial mode can correspond to when a charger has been connected to the vehicle. Additionally, the initial mode can correspond to if the driver left the vehicle more than a predefined time duration. On the other hand, the subsequent mode may correspond to a subsequent vehicle operation within a driving cycle. The subsequent mode may represent an example scenario where the vehicle has been operated and temporarily halted. This could be related to a scenario where the vehicle was being driven on a public road and the driver temporarily pulled over to the side of the road.

At block 306, the vehicle operation processing component 102 processes the set of inputs to determine/characterize the availability of the vehicle to begin operation/travel and to determine/characterize the intent of at least one vehicle occupant to begin such travel. Illustratively, a first subset of the inputs may be processed to determine/characterize the availability for the vehicle to begin operation/travel as described herein. Additionally, a second subset of inputs may be processed to determine/characterize the intent of at least one vehicle occupant to begin such travel. A sample sub-routine for processing the set of inputs for such characterizations will be described with regard to FIGS. 4A and 4B.

At decision block 308, a test is conducted to determine whether the processed set of inputs should initiate travel/operation of the vehicle. If not, at block 314, the vehicle operation processing component 102 can generate operational displays for vehicle occupants, service providers, or other third parties indicative that automatic vehicle operation has not been enabled.

Upon a positive determination, at block 310, the vehicle operational processing component identifies vehicle operational parameters. Illustratively, the vehicle operational parameters can include vehicle operating mode selection settings, directional control settings, throttle settings, and additional parameters that cause the vehicle to operate in a specified direction, speed, and path of travel.

To determine the vehicle operational parameters (or a set of defined parameters), the vehicle operation processing component can identify a desired path for the vehicle. Illustratively, the desired path determination can be based on navigational or directional systems, such as use in automated travel. Additionally, in some embodiments, the desired path determination can implement a structured order of decision that may influence the selected path and corresponding operational parameters. In one non-limiting example, the structured order of decision can be illustrated as:

1. If a closest in path vehicle (CIPV) is present and is not parked, a forward direction is recommended.
2. If the vehicle is likely parallel parked, as defined by the same map localization heuristics, then a reverse direction is recommended. The reverse direction may be contingent on vision system/collision system inputs indicating that the front clearance based on the drivable space occupancy grid is less than a threshold and the rear clearance based on the occupancy grid is more than a second threshold. Forward is recommended if these two distance conditions/thresholds are not met.
3. If a gate is detected by vision in the front cameras, forward is recommended
4. If a forward road marking is present, forward is recommended.
5. If the prior heuristics do not apply, a path planner is invoked on the drivable space occupancy grid with a target position in front of the vehicle. If a plan cannot be found that exits the parking position, the goal is moved several meters to the rear of vehicle. If a plan can still not be found to exit the parking position and a set of 'breadcrumb' position from the approach to the parking position is available, the planner will attempt to retrace previous path information stored in navigational systems.
6. If a vehicle reaches its destination, the vehicle operation processing component 102 determines the current vehicle mode as the subsequent mode. It may then automatically select the vehicle operating mode to park the vehicle. In some embodiments, the vehicle operation processing component 102 might select vehicle operating mode based on the user's historical behavior. For instance, if the user previously parked the vehicle in reverse in a parking lot associated with the current vehicle location, the vehicle operation processing component 102 might select vehicle operating mode to park the vehicle in a similar reverse position. In another example, if the vehicle is entering a charging station, the vehicle operation processing component 102 might select vehicle operating mode to park the vehicle in reverse. In scenarios such as when the vehicle is entering a garage, the vehicle operation processing component 102 may not select the vehicle operating mode into reverse and wait until the garage door is fully opened.
7. The vehicle provides a user interface that displays the vehicle's movement. For instance, when the vehicle is moving in reverse to charge its battery, the user interface shows the vehicle's backward motion. The user interface can also offer a sub-interface that controls the vehicle. For example, if the vehicle operation processing component 102 has select the vehicle operating mode to park, but the vehicle needs to move further in reverse due to a short charging cable, the user can select the sub-interface. This action prompts the vehicle operation processing component 102 to automatically select the vehicle operating mode to reverse and continue moving the vehicle closer to the charging station. In another scenario, the sub-interface can provide instructions to halt the vehicle's movement.
8. During the subsequent shifting condition, the vehicle operation processing component 102 might assign a lower confidence level to reversing the vehicle. For instance, when the vehicle is parked at the side of a public road and detects an object (e.g., another vehicle) in front, the vehicle operation processing component 102 may opt not to select the vehicle operating mode to reverse.

Illustratively, multiple iterations of the decision-making logic can result in various operational parameters. Still further, in some embodiments, the processing result of the decision-making logic can be embodied as a set or series of operational parameters that cause the vehicle to implement an ordered set of actions, an ordered set of parameters, or combinations therefore. For example, the processing result can include a combination of operational parameters that may cause the vehicle to execute a multi-point turn (e.g., one, two, or three-point turn), an ordered acceleration pattern, and the like.

At block 312, the vehicle operation processing component (assuming that the determined operational status information is available, and an error is not determined) can utilized the control components to execute the initiation of travel. In some embodiments, the initiation of travel can be dependent on some form verification/validations by an occupant, such as depressing the throttle (e.g., gas pedal), audible inputs, touch screen inputs, etc. For example, a user interface may present a selected vehicle operating mode (e.g., reverse, forward). The occupant can transition into this vehicle operating mode by selecting brake and then pushing on the accelerator. The occupant can additionally change the vehicle operating mode via user input to the user interface.

At block 316, the routine 300 terminates.

Thus, FIG. 3 describes a process by which a vehicle is able to select a vehicle operating mode, such as driving direction. This process may be performed semi-autonomously, such as via selecting a next vehicle operating mode. As described above, this selection may be presented via a user interface of a display within the vehicle. This process may also be performed autonomously, such as via autonomously controlling the vehicle and selecting forward (e.g., drive) or backwards (e.g., reverse) as necessary.

As described above, the vehicle may determine the vehicle operating mode based on information from sensors, map data, navigation data, whether the vehicle is in an initial mode or subsequent mode, and/or satisfaction of constraints or actions associated with different scenarios. Example scenarios may include residential garages, car washes, tollbooths, waiting for garage doors to operate, traffic lights, driving among stationary vehicles, and/or public roads.

For example, the vehicle may determine that it is exiting a parking spot or garage. This may be based on, for example, the vehicle being parked at a parking spot or garage based on navigation or map data. The vehicle may also determine that it is in a parking spot or garage based on a vision-based machine learning model. For example, the model may identify objects (e.g., vehicles, bollards, and so on), road markings (e.g., lines representing parking spots), and so on. As one example, the vehicle may determine that it is parallel parked based on the vehicle aligning with other vehicles in front of and/or behind the vehicle (e.g., optionally in combination with detection of a curb). When determining the vehicle operating mode, the vehicle may identify whether it is in an initial mode or subsequent mode. For example, and as described above, the initial mode may be set based on the vehicle being parked for greater than a threshold period of time, a charging cable being plugged in, or based on the occupant walking away from the vehicle. For the initial mode, the vehicle may select a reverse direction to navigate out of the parking spot. Similarly, the vehicle may select a forward or reverse direction to navigate out of a parallel parking spot based on distances to objects in front of, and behind, the vehicle. For the subsequent mode, when driving into a parking spot, the vehicle may temporarily stop and be placed into park. For example, the occupant may have thought he/she drove far enough into the spot. The vehicle may thus press the brake and the vehicle may select the forward direction to allow the vehicle to complete the park. This selection may be based on an amount of time from when the vehicle was placed into park to when the occupant indicated a desire to continue driving. As described above, the vehicle may therefore continue to be in a subsequent mode that it prefers forward or a direction the vehicle was recently going (e.g., reverse if the vehicle was backing into a parking spot).

In some embodiments, the system may update a vehicle operating mode based on satisfaction of particular constraints or actions. With respect to parallel parking and the vehicle approaching a parallel parking spot with a high steering angle, the vehicle checks if the vehicle is close enough to another vehicle car in driving direction and there is sufficient space to the car in opposite direction. This threshold may be a fraction of the total parking spot length. When previously parked and exiting a parking spot in reverse, the vehicle checks one or more of that the vehicle is fully out of the parking spot, there are no obstacles blocking the forward path, the vehicle is slowing down and had a high steering angle recently. The vehicle may also check that when an obstacle is detected, the vehicle has a high steering angle and is close enough to the obstacle. If one, or all, of the above constraints are not met, additional instructions may be displayed on the user interface indicating what's needed to automatically select a new vehicle operating mode, for example directing the driver to approach closer to an obstacle.

Figure 4A:
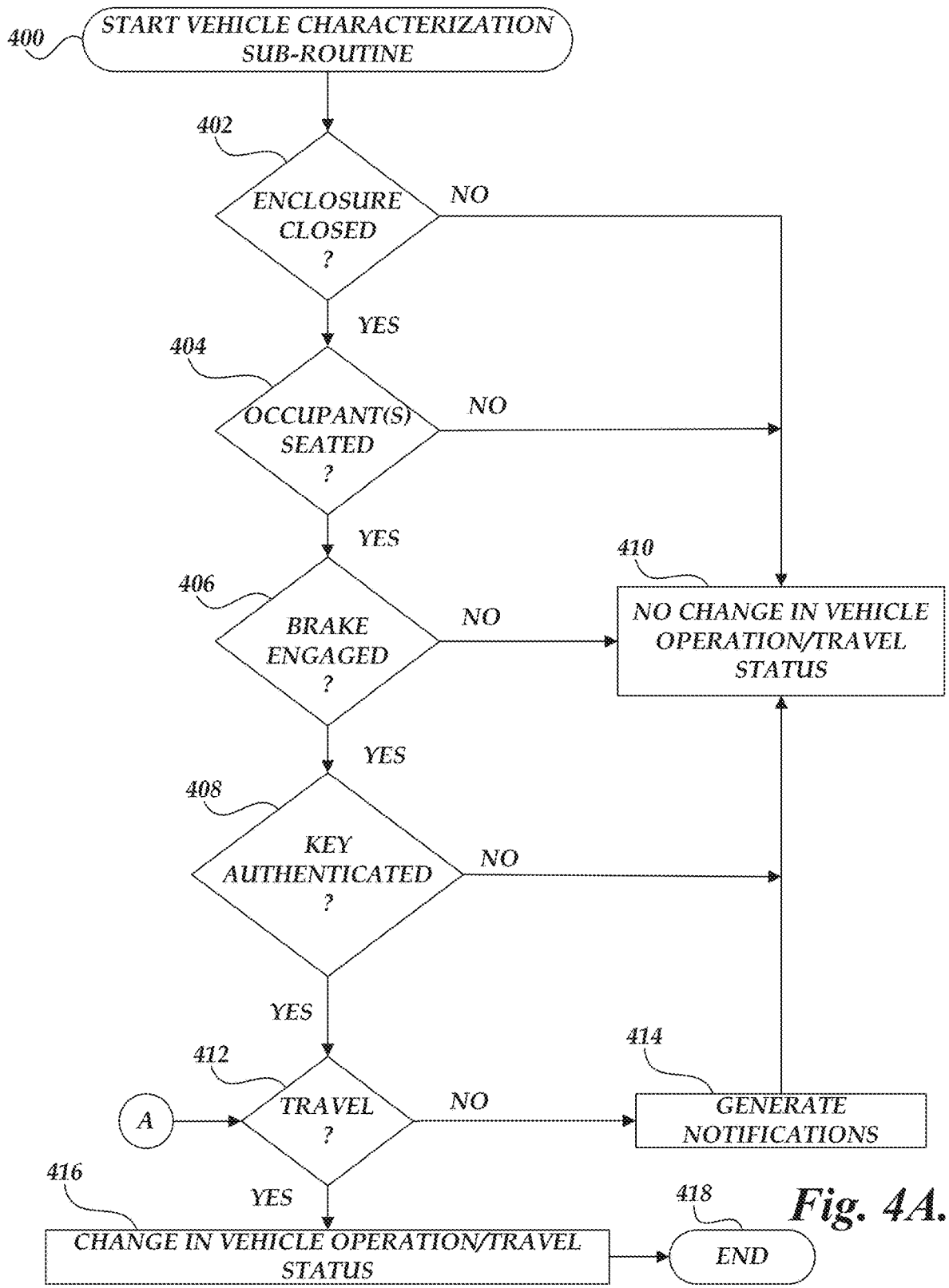
FIG. 4A is a flow diagram illustrating an example embodiment of a vehicle characterization sub-routine.
Figure 4B:
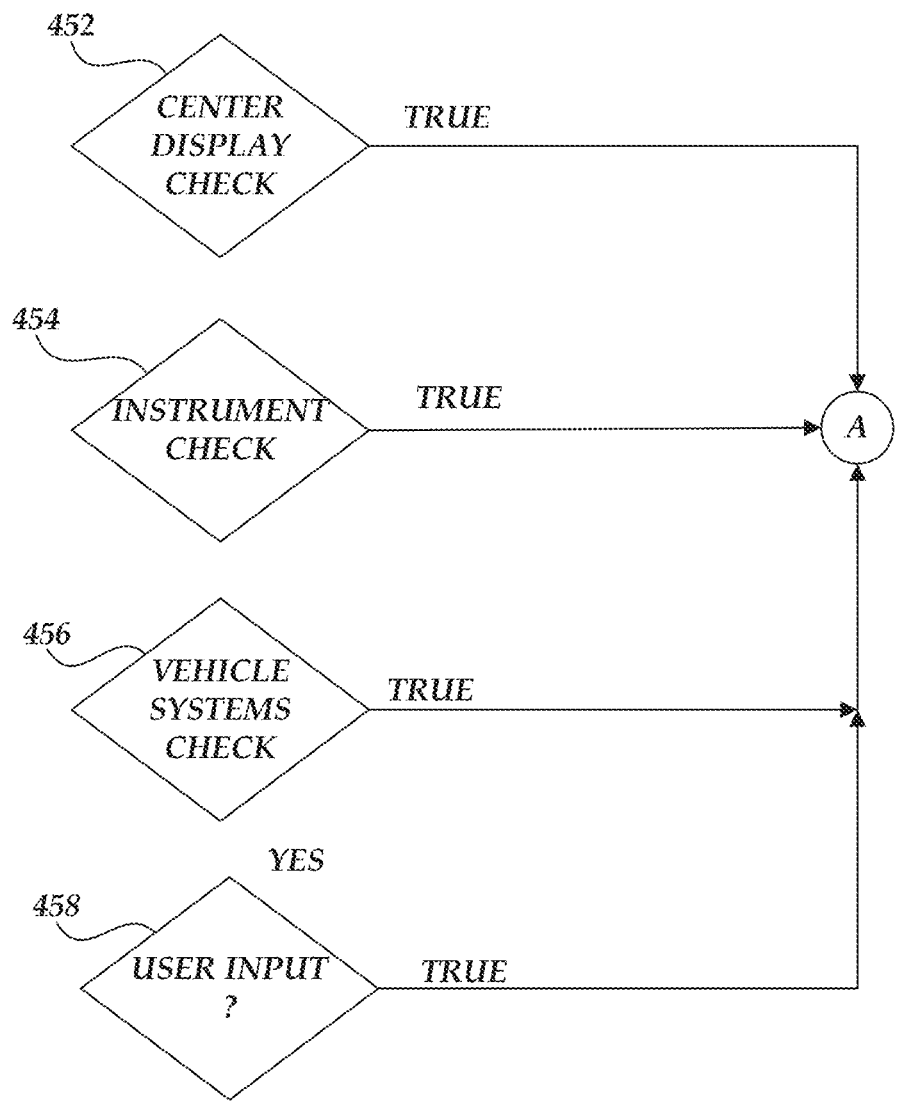
FIG. 4B is a flow diagram illustrating an example embodiment of a vehicle characterization sub-routine.

Turning now to FIGS. 4A and 4B, an illustrative sub-routine 400 implemented by the vehicle operation processing component to process the set of inputs to determine/characterize the availability for the vehicle to begin operation/travel and to determine/characterize the intent of at least one vehicle occupant to begin such travel will be described. Sub-routine 400 can correspond illustrative to Block 306 (FIG. 3).

A first portion of sub-routine 400 corresponds to a determination of whether the vehicle is (or can be characterized) as available for operation/travel. Specifically, sub-routine 400 considers various operational parameters that can indicate whether the occupant(s) desired for the vehicle to be in travel/operation. The following four decisions are illustrative of the type of operational inputs that may indicate whether there is an intent for the vehicle to initiate travel/operation. Other tests or modified tests may also be applied.

At decision block 402, a first test is conducted to determine whether the vehicle is enclosed. In one example, the vehicle operation processing component can determine whether all doors or gates are closed. In another example, the vehicle operation processing component can determine whether vehicle loading is complete or otherwise not changing (e.g., no changes in weight of the vehicle). At decision block 404, the vehicle operation processing component can determine whether occupants are seated, and seat belts are latched. The vehicle operation processing component can utilize various presence sensors to generally detect occupants. In other examples, the vehicle operation processing component can attempt to conduct more detailed identification to specifically identify individuals, such as specific, required drivers, etc.

At decision block 406, the vehicle operation processing component can determine whether one or more braking systems are engaged. In embodiments, in which user validation/verification is required, the activation of brake systems will allow the occupant/driver to validate by removal of the braking system as described previously. At decision block 408, the vehicle operation processing component can determine whether the key is detected and authenticated.

For any of the decision blocks 402-408, if the resulting answer is "no", the vehicle operation processing component can determine that the vehicle is not available for travel or operation and, at block 410, results in a determination of no change in operational status. This result can be processed at decision block 308 (FIG. 3). Illustratively, a result in the determination of no change can include having the vehicle remain in parking vehicle operating mode status or for braking systems to remain engaged to prevent travel. If the result of all decision blocks 402-408 results in a "yes", the sub-routine 400 proceeds to decision block 412.

At decision block 412, the sub-routine considers the affirmative from the four decisions that indicate an intent for the vehicle to initiate travel/operation and the availability for the vehicle to initiate travel. Specifically, sub-routine 400 considers various additional operational parameters that can indicate whether the vehicle is available to be in travel/operation. The following four decisions are illustrative of the type of operational inputs that may indicate whether vehicle is available to initiate travel/operation. Other tests or modified tests may also be applied.

Turning now to FIG. 4B, at decision block 452, the vehicle operation processing component determines whether the center display is available for information and input related to the ability to select a vehicle operating mode. At decision block 454, the vehicle operation processing component determines whether the instrument cluster is available to provide information regarding the operational parameters (vehicle operating mode selection settings, wheel alignment, throttle positions). At decision block 456, the vehicle operation processing component determines whether the vehicle systems are engaged and capable of holding a grade automatically using brakes after unparking. At decision block 458, the vehicle operation processing component determines whether the user input mechanisms (throttle position, screen displays) are available to receive information. If all the decision block 452-458 are "true" or "yes" the vehicle can illustratively be characterized as available for travel.

Returning to decision block 412, if the results of the various decision blocks result in a determined availability for the vehicle to begin operation/travel and determined intent of at least one vehicle occupant to begin such travel, at block 416, the vehicle operation processing component can determine that the vehicle is available for travel or operation and, at block 410, results in a determination of change in operational status. This result can be processed at decision block 308 (FIG. 3). Alternatively, the vehicle operation processing component can determine that the vehicle is not available for travel or operation and, at block 410, results in a determination of no change in operational status. This result can be processed at decision block 308 (FIG. 3). Routine 400 returns at block 418.

Parallel Parking Scenario

Figure 5A:
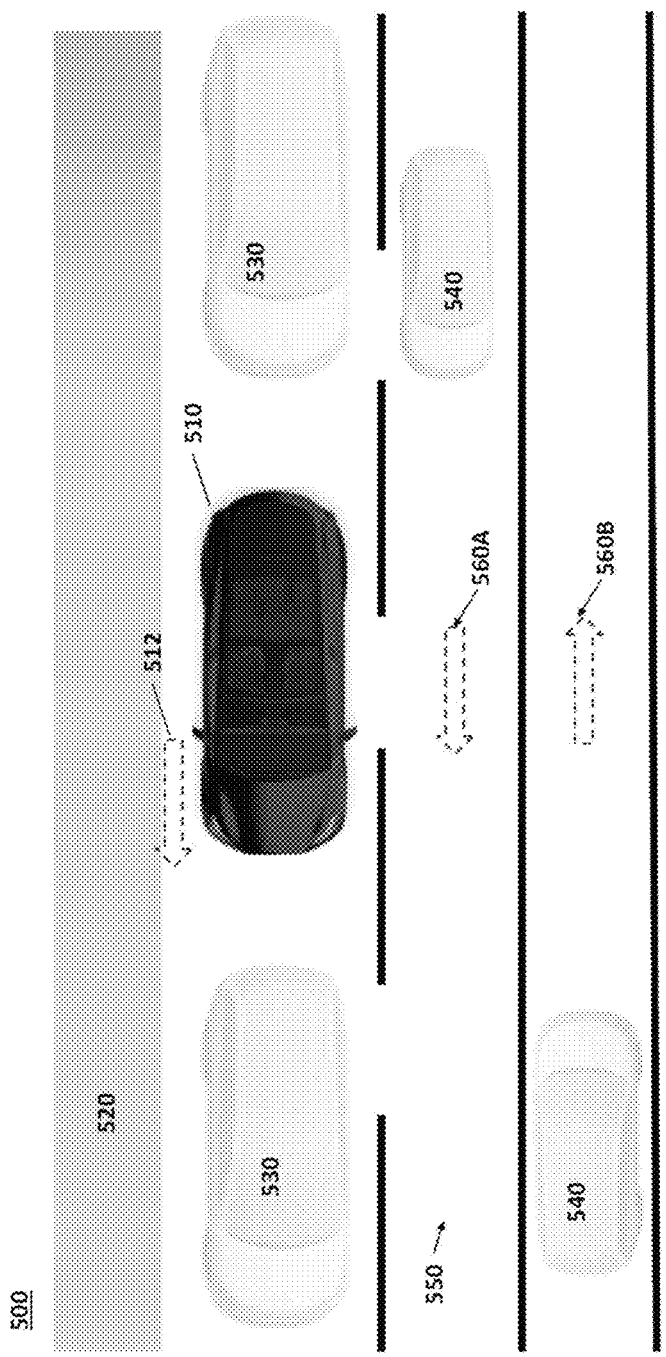
FIG. 5A illustrates an example of a parallel parking scenario.

FIG. 5A illustrates a parallel parking scenario 500. In scenario 500, the vehicle 510 can be equipped with the system environment described in FIGS. 1A-1D, such that the vehicle 510 can include the processor system 130, the vehicle operation processing component 102, detection sensors, cameras, and the like, as described herein. The processor system 130, the vehicle operation processing component 102 implemented in the vehicle 510 can perform one or more embodiments as disclosed herein.

In some embodiments, the vehicle 510 may identify the current location by identifying surrounding objects, as described in FIGS. 1A-1D. In these embodiments, a vehicle operation processing component 102 can determine the vehicle operating mode based on the identified current location. For example, the image sensors 122, 124, 126, and 128 (shown in FIG. 1B) may capture image information (e.g., image information 132 shown in FIG. 1C) of the surroundings, such as the sidewalk 520, parked vehicles 530, road 550, and moving vehicles 540. In this example, the vehicle 510 may identify that the vehicle is parallel parked. Here, the vehicle 510 could gauge the distance from the sidewalk 520 to itself and from itself to each of the parked vehicles 530 and the sidewalk 520. In some embodiments, the location system (e.g., navigation 122 and GPS 110 described in FIG. 1A) determines whether the vehicle 510 is parallel parked. For example, the navigation information may provide the road information, including vehicle moving direction 560A, 560B. In some embodiments, the vehicle 510 may identify whether the vehicle is parallel parked based on the vehicle orientation 512 and the identified vehicle moving direction 560A. For example, when the vehicle 510 is stationary positioned with forward orientation 512, the location can be determined that the vehicle 510 is parallel parked with the same direction of the vehicle moving direction 560A. In other cases where the vehicle 510 needs to drive to the road 550 in the reverse direction 560B, the vehicle 510 may need to make multi-point turn (e.g., three-point turn) to merge into the road 550 to the reverse direction 560B. As described below, a user interface may graphically describe the vehicle operating modes which are required to perform this multi-point turn.

In some embodiments, when the vehicle 510 is identified that it is not parallel parked, the vehicle operation processing component 102 may hold for receiving additional information. For example, the vehicle operation processing component 102, upon determining that the current operating mode is an initial mode, may wait for an instruction from vehicle's autonomous driving processor. In another example, the vehicle operation processing component 102, during the subsequent mode, may wait for the driver's manual selection (e.g., driver selects the vehicle operating mode).

Figure 5B:
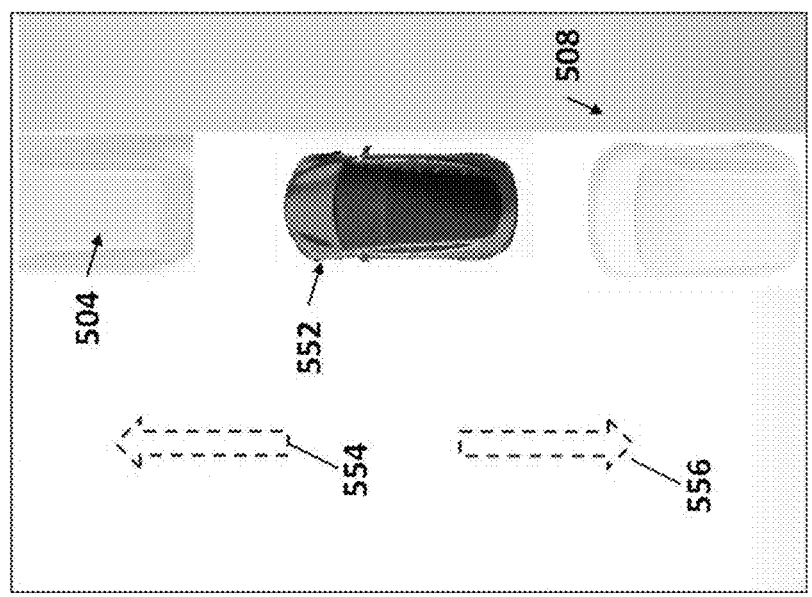
FIG. 5B illustrates an example user interface.

The user interface illustrated in FIG. 5B displays the vehicle location along with surrounding objects (e.g., vehicle 504, curb 508, and so on). Illustratively, the vehicle operation processing component 102 may predict that the diver intends to move the vehicle, such that the prediction is based on the driver input, such as pressing the brake pedal. Upon detecting the driver input, the vehicle operation processing component 102 may automatically select the vehicle operating mode into reverse direction based on detected distances between vehicles in front of, and behind, the vehicle.

Advantageously, the user interface may graphically illustrate a current, and optionally subsequent, vehicle operating mode(s) to navigate out of the parking spot. For example, when the driver gets into the vehicle and indicates a preference to move (e.g., presses brake), the user interface may present an arrow or other graphical indicia representing a direction the vehicle is to move (e.g., forward or reverse).

The user interface may indicate a series of arrows or indicia which graphically describe the entire journey to navigate out of the parking spot. For example, a first arrow may be shown larger than subsequent arrows. In this example, the driver may therefore be presented with information indicating that he/she will navigate in a direction corresponding to the first arrow and then navigate in an opposite direction thereafter.

In some embodiments, the user interface may display an animation showing the correct movements to navigate away from the spot. For example, the animation may depict the vehicle performing certain turn angles and driving directions. The user interface may additionally present the real-time position of the vehicle in comparison to the animation such that the driver may determine how far to navigate forward or backward, what steering angle to use, and so on. The user interface may also display a path the vehicle is to follow such that the driver may determine how far forward or backward to drive. In this way the driver may determine when to press brake, to then cause the vehicle to select a subsequent vehicle operating mode. Upon selection, the driver may then use the animation and real-time position of the vehicle to navigate forwards or backwards until its time to push brake again.

The above description focused on parallel parking. In some embodiments, the techniques of FIGS. 5A-5B may be applied to three-point turns.

Additional Examples

When the vehicle is parked, the vehicle operation processing component 102 determines the torque direction that the vehicle used when entering into the parking spot. For example, the determination is based on the distance driven for each torque direction. The determination is also based on the threshold distance. For example, if the driven distance is less than the threshold (e.g., straightening the vehicle in the parking spot), the vehicle operation processing component 102 may not change or select the vehicle operating mode.

The vehicle operation processing component 102 may identify whether the vehicle is parallel parked based on the navigation data and road type. For example, the vehicle operation processing component 102 compares the heading of the vehicle with the heading of the road and asserts that the vehicle is parallel parked if the headings are within a certain angular threshold.

The prediction result of selecting the vehicle operating mode can be used as training data for the vehicle operation processing component 102.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated the appended claims rather than by the foregoing description. All changes which come within the meaning and range of equivalency of the claims are to be embraced within their scope.

What is claimed:

1. A system for managing vehicle operation, the system implemented in a vehicle and comprising a processor and a memory for executing computer-executable instructions to:
   obtain vehicle data, the vehicle data comprising a first set of data that corresponds to behaviors of a driver and a second set of data that corresponds to current vehicle status, wherein the first set of data is received from at least a first subset of a plurality of vehicle sensors configured to sense driver interaction with the vehicle, wherein the second set of data is determined from at least a second subset of the plurality of vehicle sensors associated with the current vehicle status, the second subset including at least a plurality of image sensors positioned about the vehicle,
   wherein the second set of data comprises obstacle occupancy information formed from a plurality of voxels separating a three-dimensional environment about the vehicle, wherein individual voxels indicate detection of a real-world object,
   and wherein the obstacle occupancy information is determined based on a forward pass of image information from the plurality of image sensors through a vision-based machine learning model;
   determine a type of current vehicle mode based on the second set of data, the current vehicle mode comprising an initials mode and a subsequent mode by determining at least whether the vehicle is in a stationary position at or above a threshold time period based on the second set of data, wherein the initial mode is determined when the vehicle is in the stationary position at or above the threshold time period, and wherein the subsequent mode represents when the vehicle is in the stationary position less than the threshold time period;
   process the first set of data to determine whether the driver has indicated an intent for the vehicle to initiate travel;
   in response to determining that the driver indicated the intent to initiate travel, determine confidence level of each vehicle operating mode, wherein the vehicle operating mode comprises forward and reverse, and wherein the confidence level is dynamically determined for each vehicle operating mode based on the determined initial and subsequent mode;
   select one of the vehicle operating modes based on the confidence levels; and
   transmit a control signal to a drive inverter of the vehicle to cause the vehicle to operate according to the selection.

2. The system as recited in claim 1, wherein the second set of data comprises one or more of navigational information, positioning information, or vehicle operational information.

3. The system as recited in claim 1, wherein the current vehicle mode is determined based on a driving cycle, wherein the initial mode corresponds to when no vehicle operating mode is selected during the driving cycle, and wherein the subsequent mode corresponds to when the vehicle operating mode is selected during the driving cycle.

4. The system as recited in claim 1, wherein, during the subsequent mode, the confidence level for selecting the vehicle operating mode to reverse direction is low.

5. The system as recited in claim 1, wherein the confidence level is configured to vary based on the determined vehicle mode.

6. The system as recited in claim 1, wherein processing the first set of data comprises:
- determining whether a vehicle enclosure is closed;
- determining whether occupant(s) is seated;
- determining whether a brake is engaged;
- determining whether a key is authenticated; and
- determining whether the driver provided a driver input, wherein the driver input is provided by pressing brake pedal.

7. The system as recited in claim 1, wherein the selecting one of the vehicle operating modes comprises shifting vehicle gear to the forward or reverse.

8. Non-transitory computer readable storage comprising instructions that, when executed by one or more processors, cause the processors to perform operations comprising:
- obtaining a set of operational information associated with a vehicle, the set of operational information comprising a first set of data that corresponds to behaviors of a driver and a second set of data that corresponds to current vehicle status, wherein the first set of data is received from at least a first subset of a plurality of vehicle sensors configured to sense driver interaction with the vehicle,
- wherein the second set of data is determined from at least a second subset of the plurality of vehicle sensors associated with the current vehicle status, the second subset including at least a plurality of image sensors positioned about the vehicle,
- wherein the second set of data comprises obstacle occupancy information formed from a plurality of voxels separating a three-dimensional environment about the vehicle, wherein individual voxels indicate detection of a real-world object,
- and wherein the obstacle occupancy information is determined based on a forward pass of image information from the plurality of image sensors through a vision-based machine learning model;
- determining a type of current vehicle mode based on the second set of data, the current vehicle mode comprising an initial mode and a subsequent mode by determining at least whether the vehicle is in a stationary position at or above a threshold time period based on the second set of data, wherein the initial mode is determined when the vehicle is in the stationary position at or above the threshold time period, and wherein the subsequent mode represents when the vehicle is in the stationary position less than the threshold time period;
- processing the first set of data to determine whether the driver has indicated an intent for the vehicle to initiate travel;
- in response to determining that the driver indicated the intent to initiate travel, determining confidence level of each vehicle operating mode, wherein the vehicle operating mode comprises forward and reverse, and wherein the confidence level is dynamically determined for each vehicle operating mode based on the determined initial and subsequent mode;
- selecting one of the vehicle operating modes based on the confidence levels; and
- transmitting a control signal to a drive inverter of the vehicle to cause the vehicle to operate according to the selection.

9. The computer readable storage of claim 8, wherein the set of operational information includes one or more of navigational information, positioning information, or vehicle operational information.

10. The computer readable storage of claim 8, wherein the operations further comprise determining whether a driver of the vehicle intended for vehicle operation, comprising:
- determining whether a vehicle enclosure is closed;
- determining whether occupant(s) seated;
- determining whether a brake is engaged;
- determining whether a key is authenticated; and
- determining whether the driver provided a driver input, wherein the driver input is provided by pressing brake pedal.

11. The computer readable storage of claim 8, wherein the current vehicle mode is determined based on a driving cycle, wherein the initial mode corresponds to when no vehicle operating mode is selected during the driving cycle, and wherein the subsequent mode corresponds to when the vehicle operating mode is selected during the driving cycle.

12. The computer readable storage of claim 8, wherein predicting selection of the vehicle operating mode is based on comparing confidence level of each vehicle operating mode.

13. The computer readable storage of claim 12, wherein the confidence level for each vehicle operating mode is configured to vary based on the determined vehicle mode.

14. The computer readable storage of claim 12, wherein, during the subsequent mode, the confidence level for selecting the vehicle operating mode to reverse direction is low.

15. A computer-implemented method for managing vehicle operation, the method comprising:
- obtaining vehicle data, the vehicle data comprising a first set of data that corresponds to behaviors of a driver and a second set of data that corresponds to current vehicle status, wherein the first set of data is received from at least a first subset of a plurality of vehicle sensors configured to sense driver interaction with the vehicle,
- wherein the second set of data is determined from at least a second subset of the plurality of vehicle sensors associated with the current vehicle status, the second subset including at least a plurality of image sensors positioned about the vehicle,
- wherein the second set of data comprises obstacle occupancy information formed from a plurality of voxels separating a three-dimensional environment about the vehicle, wherein individual voxels indicate detection of a real-world object,
- and wherein the obstacle occupancy information is determined based on a forward pass of image information from the plurality of image sensors through a vision-based machine learning model;
- determining a type of current vehicle mode, the current vehicle mode comprising initial mode and subsequent mode based on the second set of data, the current vehicle mode comprising an initial mode and a subsequent mode by determining at least whether the vehicle is in a stationary position at or above a threshold time period based on the second set of data, wherein the initial mode is determined when the vehicle is in the stationary position at or above the threshold time period, and wherein the subsequent mode represents when the vehicle is in the stationary position less than the threshold time period;
- processing the first set of data to determine whether the driver has indicated an intent for the vehicle to initiate travel;
- in response to determining that the driver indicated the intent to initiate travel, determining confidence level of each vehicle operating mode, wherein the vehicle operating mode comprises forward and reverse, and wherein the confidence level is dynamically determined for each vehicle operating mode based on the determined initial and subsequent mode;

selecting one of vehicle operating mode based on the confidence levels, and transmitting a control signal to a drive inverter of the vehicle to cause the vehicle to operate according to the selection.

16. The computer-implemented method of claim 15, wherein the second set of data comprises one or more of navigational information, positioning information, or vehicle operational information.

17. The computer-implemented method of claim 15, wherein the current vehicle mode is determined based on a driving cycle, wherein the initial mode corresponds to when no vehicle operating mode is selected during the driving cycle, and wherein the subsequent mode corresponds to when the vehicle operating mode is selected during the driving cycle.

18. The computer-implemented method of claim 15, wherein, during the subsequent mode, the confidence level for selecting the vehicle operating mode to reverse the vehicle is low.

19. The computer-implemented method of claim 15, wherein processing the first set of data comprising:
   determining whether a vehicle enclosure is closed;
   determining whether occupant(s) seated;
   determining whether a brake is engaged;
   determining whether a key is authenticated; and
   determining whether the driver provided a driver input, wherein the driver input is provided by pressing brake pedal.

20. The computer-implemented method of claim 15, wherein the confidence level is configured to vary based on the determined vehicle mode.

* * * * *